US012695083B2

(12) United States Patent
      Herle

(10) Patent No.: US 12,695,083 B2
(45) Date of Patent: Jul. 28, 2026

(54) HIGH VOLUME MANUFACTURING OF ALLOY ANODES FOR LI-ION BATTERY

(71) Applicant: ELEVATED MATERIALS US LLC, Santa Clara, CA (US)

(72) Inventor: Subramanya P. Herle, Mountain View, CA (US)

(73) Assignee: Elevated Materials US LLC, Santa Clara, CA (US)

( * ) Notice: Subject to any disclaimer, the term of this patent is extended or adjusted under 35 U.S.C. 154(b) by 800 days.

(21) Appl. No.: 17/731,982

(22) Filed: Apr. 28, 2022

(65) Prior Publication Data
      US 2022/0376226 A1        Nov. 24, 2022

Related U.S. Application Data

(60) Provisional application No. 63/191,649, filed on May 21, 2021.

(51) Int. Cl.
      H01M 4/1395        (2010.01)
      B23K 26/00        (2014.01)
      (Continued)

(52) U.S. Cl.
      CPC ....... H01M 4/1395 (2013.01); B23K 26/0006 (2013.01); B23K 26/382 (2015.10);
      (Continued)

(58) Field of Classification Search
      CPC ............. H01M 4/1395; H01M 4/0402; H01M 4/0471; H01M 2004/027; H01M 4/0404;

H01M 4/366; H01M 2004/021; H01M 4/38; H01M 4/387; H01M 4/134; H01M 4/382; H01M 4/386; H01M 4/661; H01M 10/052; B23K 26/0006; B23K 26/382; B23K 2103/02; B23K 2103/10; B23K 2103/12;
      (Continued)

(56) References Cited

U.S. PATENT DOCUMENTS 9,231,247 B2    1/2016  Ichikawa
9,340,894 B2    5/2016  Biswal et al.
                (Continued)

FOREIGN PATENT DOCUMENTS

CN        101847708 A        9/2010
CN        109417164 A        3/2019
                (Continued)

OTHER PUBLICATIONS

KR-20200030436-A,, machine translation. (Year: 2020).*
                (Continued)

*Primary Examiner* — John A Hevey
(74) *Attorney, Agent, or Firm* — Lee & Hayes, P.C.

(57)        ABSTRACT

Embodiments of the present disclosure generally relate to flexible substrate fabrication. In particular, embodiments described herein relate to methods for flexible substrate fabrication which can be used to improve the life of lithium-ion batteries. In one or more embodiments, a method of fabricating alloy anodes includes forming an alloy anode using a planar flow melt spinning process including solidifying a molten material over a quenching surface of a rotating casting drum and performing a pre-lithiation surface treatment on the alloy anode.

20 Claims, 7 Drawing Sheets

(51) Int. Cl.

| | |
|---|---|
| *B23K 26/382* | (2014.01) |
| *B23K 103/00* | (2006.01) |
| *B23K 103/02* | (2006.01) |
| *B23K 103/10* | (2006.01) |
| *B23K 103/12* | (2006.01) |
| *H01M 4/02* | (2006.01) |
| *H01M 4/04* | (2006.01) |

(52) U.S. Cl.
CPC ....... *H01M 4/0402* (2013.01); *H01M 4/0471* (2013.01); *B23K 2103/02* (2018.08); *B23K 2103/10* (2018.08); *B23K 2103/12* (2018.08); *B23K 2103/50* (2018.08); *H01M 2004/027* (2013.01)

(58) Field of Classification Search
CPC ............ B23K 2103/50; B23K 2101/36; B23K 2103/08; B23K 26/0622; B23K 26/0846; B23K 26/40; B23K 26/384; Y02E 60/10
See application file for complete search history.

(56) References Cited

U.S. PATENT DOCUMENTS

| | | | |
|---|---|---|---|
| 10,629,900 B2 | 4/2020 | Dutta et al. | |
| 11,185,915 B2 | 11/2021 | Herle | |
| 2007/0251665 A1* | 11/2007 | Byrne ................ | B22D 11/0611 |
| | | | 164/463 |
| 2013/0045420 A1 | 2/2013 | Biswal et al. | |
| 2013/0216905 A1 | 8/2013 | Ichikawa | |
| 2016/0013511 A1 | 1/2016 | Rust, III et al. | |
| 2016/0023438 A1* | 1/2016 | Johnson .................. | C22C 45/02 |
| | | | 148/536 |
| 2016/0344016 A1 | 11/2016 | Biswal et al. | |
| 2017/0098820 A1 | 4/2017 | Obrovac et al. | |
| 2021/0050593 A1* | 2/2021 | Brewer .............. | H01M 4/0404 |
| 2021/0060638 A1 | 3/2021 | Herle | |
| 2022/0080496 A1 | 3/2022 | Herle | |
| 2022/0152693 A1 | 5/2022 | Herle | |

FOREIGN PATENT DOCUMENTS

| | | | |
|---|---|---|---|
| CN | 110224122 A | | 9/2019 |
| CN | 111316478 A | | 6/2020 |
| CN | 112400245 A | | 2/2021 |
| CN | 112838191 A | | 5/2021 |
| JP | 2006228512 A | | 8/2006 |
| JP | 2006324020 A | | 11/2006 |
| JP | 2012084522 A | | 4/2012 |
| JP | 2016058375 A | | 4/2016 |
| JP | 2017173087 A | | 9/2017 |
| JP | 2018170251 A | | 11/2018 |
| KR | 1020200018147 A | | 2/2020 |
| KR | 20200030436 A | * | 3/2020 |
| WO | 2011028613 A2 | | 3/2011 |
| WO | 2011028613 A3 | | 3/2011 |
| WO | 2014081085 A1 | | 5/2014 |
| WO | 2017001118 A1 | | 1/2017 |
| WO | 2020016240 A1 | | 1/2020 |
| WO | 2021074424 A1 | | 4/2021 |

OTHER PUBLICATIONS

Smith, "Simple, low-cost planar flow casting machine for rapid solidification processing," Rev. Sci. Instrum. 57 (8), Aug. 1986, pp. 1647-1653. (Year: 1986).*

"High capacity lithium-ion batteries! Laser drilling of a whole electrode," Nikkei Electronics, Oct. 2018 pp. 1-6 (Year: 2018).*

International Search Report and Written Opinion dated Aug. 17, 2022 for Application No. PCT/US2022/026801).

Chevrier et al., "Evaluating Si-Based Materials for Li-Ion Batteries in Commercially Relevant Negative Electrodes" Journal of The Electrochemical Society, 161 (5) A783-A791 (2014).

Stegmaier, "Si alloy material for next Generation Li ion batteries" BASMATI Workshop, Barcelona, Nov. 23, 2016; 11 pages.

Cao et al., "Electrochemistry and Thermal Behavior of SiOx Made by Reactive Gas Milling" Journal of the Electrochemical Society, (2020) 167, 110501; 12 pages.

Jansen et al., "Influence of Laser-Generated Cutting Edges on the Eletrical Performance of Large Lithium-Ion Pouch Cells" Batteries (2019) 5, 73; 20 pages.

"High capacity lithium-ion batteries! Laser drilling of a whole electrode" Nikkei Electronics, Oct. 2018; 6 pages.

Kasavajula et al., "Nano- and bulk-silicon-based insertion anodes for lithium-ion secondary cells" Journal of Power Sources 163 (2007) 1003-1039.

Obrovac et al., "Alloy Negative Electrodes for Li-Ion Batteries" Chemical Rev. 2014, 114, 11444-11502.

"Example of high-speed laser drilling into negative electrodes for lithium-ion batteries by Roll to Roll" Wired Co., Ltd.; (Sep. 24, 2020) 3 pages.

An et al., "Scalable synthesis of ant-nest-like bulk porous silicon for high-performance lithium-ion battery anodes" Nature Communications (2019) 10:1447; 11 pages.

Huang et al., "Si-Composite Anode for Lithium-Ion Batteries with High Initial Coulombic Efficiency" Energy Technol. 2013, 1, 305-308.

European Search Report for European Application No. 22805157.9, dated Apr. 3, 2025, 14 pages.

Japanese Office Action for Application No. 2023-571908, dated Mar. 4, 2025, 7 pages.

Vassileva, et al. "Porous Sn obtained by selective electrochemical dissolution of melt-spun Zn70Sn30 alloys with lithium and sodium storage properties" Journal of Alloys and Compounds, Elsevier Sequoia, Lausanne, CH, vol. 877, May 10, 2021.

Extended European Search Report for European Application No. 22805157.9, dated Jun. 25, 2025, 13 pages.

Office Action for Japanese Application No. 2023-571908, dated Oct. 7, 2025, 16 pages.

Office Action for Japanese Application No. 2023-571908, dated Mar. 4, 2025, 7 pages.

Office Action for Korean Application No. 10-2023-7043942, dated Aug. 5, 2025, 8 pages.

Pfleging, "A review of laser electrode processing for development and manufacturing of lithium-ion batteries", Nanophotonics 2018, 7(3), Oct. 8, 2017, pp. 549-573.

Office Action for Japanese Application No. 2023-571908, dated Apr. 14, 2026, 18 pages.

Office Action for Chinese Application No. 202280036155.3, dated Jun. 16, 2026, 18 pages.

"Technology Roadmap for Energy Saving and New Energy Vehicles 2.0 Edition 2", Society of Automotive Engineers of China, Beijing, Jan. 31, 2021, pp. 1-6.

* cited by examiner

200

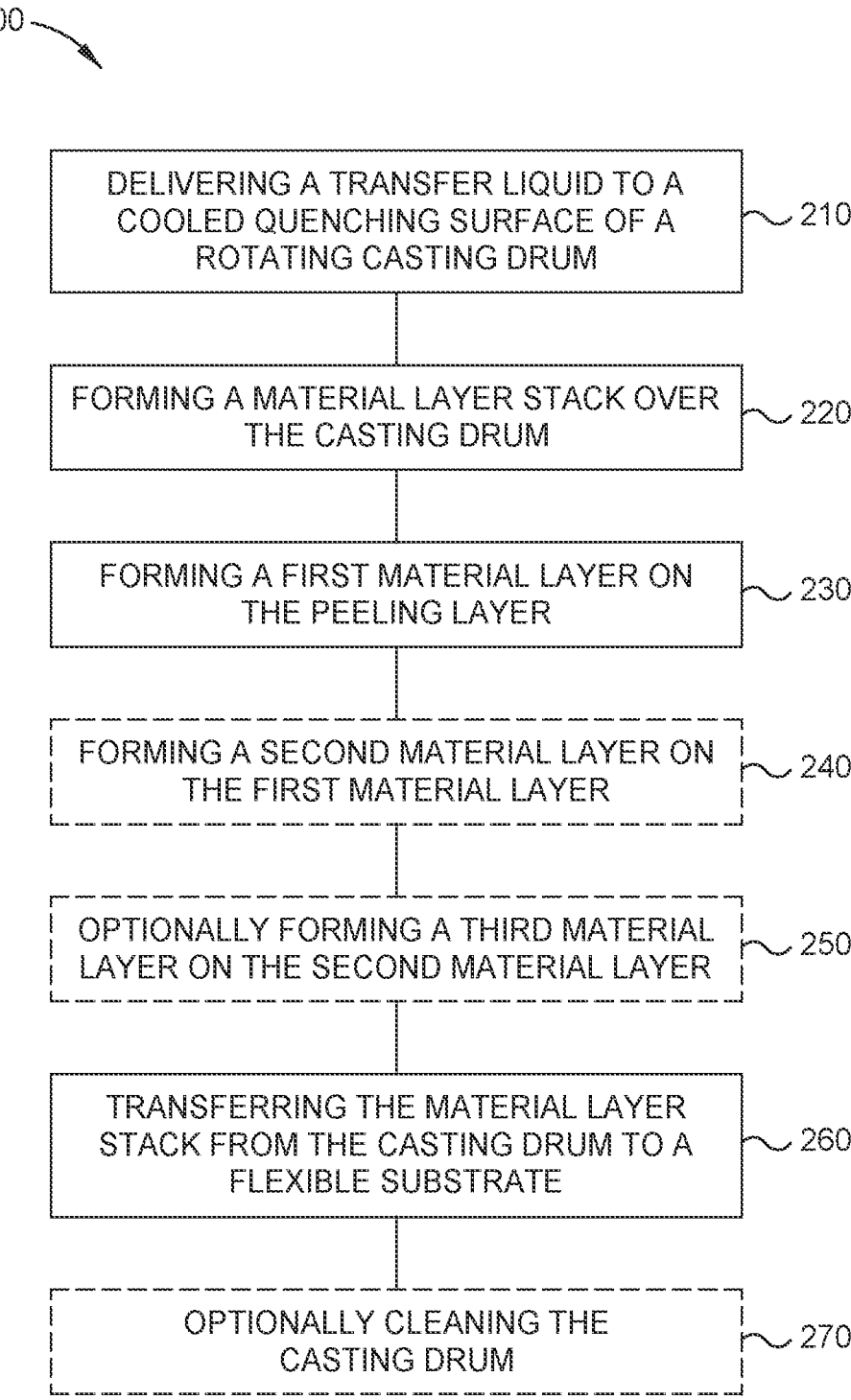

DELIVERING A TRANSFER LIQUID TO A COOLED QUENCHING SURFACE OF A ROTATING CASTING DRUM — 210

FORMING A MATERIAL LAYER STACK OVER THE CASTING DRUM — 220

FORMING A FIRST MATERIAL LAYER ON THE PEELING LAYER — 230

FORMING A SECOND MATERIAL LAYER ON THE FIRST MATERIAL LAYER — 240

OPTIONALLY FORMING A THIRD MATERIAL LAYER ON THE SECOND MATERIAL LAYER — 250

TRANSFERRING THE MATERIAL LAYER STACK FROM THE CASTING DRUM TO A FLEXIBLE SUBSTRATE — 260

OPTIONALLY CLEANING THE CASTING DRUM — 270

FIG. 2

HIGH VOLUME MANUFACTURING OF ALLOY ANODES FOR LI-ION BATTERY

CROSS-REFERENCE TO RELATED APPLICATIONS

This application claims benefit to U.S. Prov. Appl. No. 63/191,649, filed on May 21, 2021, which is herein incorporated by reference.

BACKGROUND

Field

Embodiments of the present disclosure generally relate to flexible substrate fabrication. In particular, embodiments described herein relate to methods for flexible substrate fabrication for improving lithium-ion battery life.

Description of the Related Art

Flexible substrates may be used for packaging, semiconductor, and photovoltaic applications. Processing of flexible substrates may include coating a flexible substrate with a desired material, such as a metal, semiconductors, and/or dielectric materials. Systems for performing processing of flexible substrates generally include a processing drum, e.g., a cylindrical roller, coupled to a processing system for transporting the substrate, and on which at least a portion of the substrate is processed. Roll-to-roll coating systems thereby provide a relatively high throughput system.

When lithium is stored in the anode as part of the charging, it may result in unwanted volumetric expansion of the anode, thereby reducing battery life of the resulting lithium-ion battery. Accordingly, what is needed in the art is methods for flexible substrate fabrication for improving lithium-ion battery life.

SUMMARY

Embodiments of the present disclosure generally relate to flexible substrate fabrication. In particular, embodiments described herein relate to methods for flexible substrate fabrication for improving lithium-ion battery life. In one or more embodiments, a method of fabricating alloy anodes includes forming an alloy anode using a planar flow melt spinning process including solidifying a molten material over a quenching surface of a rotating casting drum. The method further includes performing a pre-lithiation surface treatment on the alloy anode.

In some embodiments, a method of fabricating alloy anodes includes forming an alloy anode including lithium using a planar flow melt spinning process including solidifying a molten material over a quenching surface of a rotating casting drum. The method further includes depositing a protection layer on the alloy anode.

In other embodiments, a method of fabricating alloy anodes includes forming an alloy anode using a planar flow melt spinning process, creating engineered porosity in the alloy anode through laser drilling, performing a pre-lithiation surface treatment, depositing a protection layer on the alloy anode, and laminating the alloy anode onto a current collector.

In some embodiments, a non-transitory computer readable medium has stored thereon instructions, which, when executed by a processor, causes the process to perform operations of the above apparatuses and/or methods.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, and may admit to other equally effective embodiments.

FIG. 2 is a flow chart illustrating a method for coating a flexible substrate, according to one or more embodiments described and discussed herein.

To facilitate understanding, identical reference numerals have been used, where possible, to designate identical elements that are common to the figures. It is contemplated that elements and features of one embodiment may be beneficially incorporated in other embodiments without further recitation.

Figure 1:
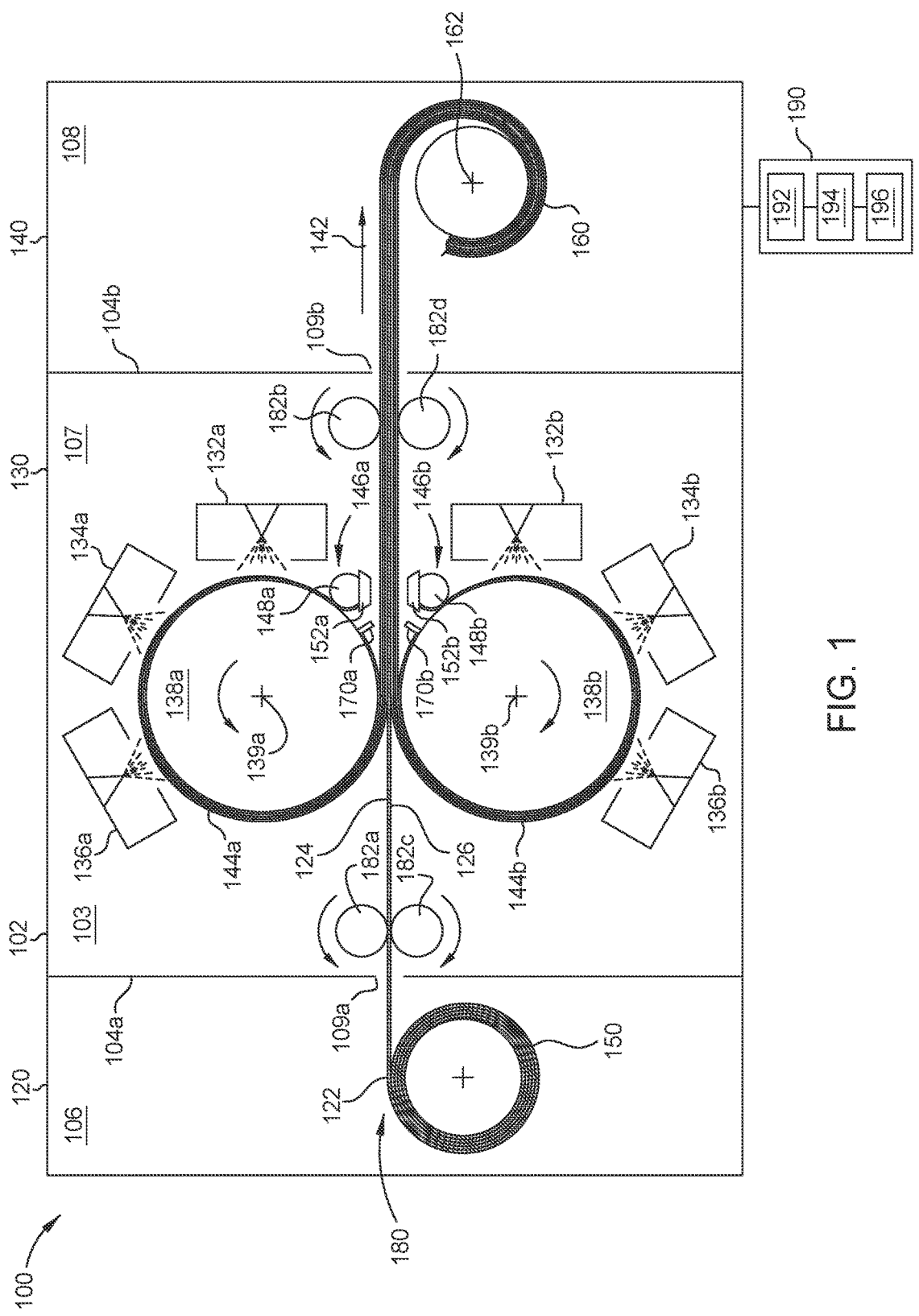
FIG. 1 depicts a schematic, cross-sectional view of a coating chamber, according to one or more embodiments described and discussed herein.

Many of the details, dimensions, angles and other features shown in the Figures are merely illustrative of particular embodiments. Accordingly, other embodiments can have other details, components, dimensions, angles and features without departing from the spirit or scope of the present disclosure. In addition, further embodiments of the disclosure can be practiced without several of the details described below.

DETAILED DESCRIPTION

Embodiments of the present disclosure generally relate to flexible substrate fabrication. In particular, embodiments described herein relate to methods for flexible substrate fabrication for improving lithium-ion battery life. Certain details are set forth in the following description and in FIGS. 1A-6 to provide a thorough understanding of various embodiments of the disclosure. Other details describing well-known structures and systems often associated with web coating, web transfer, and adjusting web tension of a flexible substrate or web in a roll-to-roll deposition system are not set forth in the following disclosure to avoid unnecessarily obscuring the description of the various embodiments.

Embodiments described and discussed herein are provided below in reference to a roll-to-roll coating system. Exemplary roll-to-roll coating systems can be or include a TopMet™ system, a SmartWeb™ system, or a TopBeam™ system, all of which are commercially available from Applied Materials, Inc. of Santa Clara, California. Other tools capable of performing roll-to-roll processing can also be adapted to benefit from the embodiments described herein. The apparatus description described herein is illustrative and should not be construed or interpreted as limiting the scope of the embodiments described herein. In addition, the embodiments described herein are applicable to a flexible substrate having a coating on a single side or a flexible substrate having a coating on opposing sides or a "dual-sided" coating.

It is noted that while the particular substrate on which some embodiments described herein can be practiced is not limited, it is particularly beneficial to practice the embodiments on flexible substrates, including for example, web-based substrates, panels and discrete sheets.

It is also noted here that a flexible substrate or web as used within the implementations described herein can typically be characterized in that it is bendable. The term "web" can be synonymously used to the term "strip," the term "flexible substrate," or the like. For example, the web as described in implementations herein can be a foil. Synonyms of the term "web" are strip, foil, flexible substrate or the like. Typically, a web includes a continuous sheet of thin and flexible material. Typical web materials are metals, plastics, paper, or the like. A web as understood herein is typically a three dimensional solid body. The thickness of the web as understood herein can be less than 1 mm, more typically less than 500 mm or even less than 10 mm. A web as understood herein can have a width of at least 0.1 m, more typically at least 1 m or even at least 4 m. A web as understood herein can have a length of at least 1 km, 25 km or even 60 km.

It is further noted that in the present disclosure, a "roll" or a "roller" can be understood as a device, which provides a surface, with which a substrate (or a part of a substrate) can be in contact during the presence of the substrate in the processing system. At least a part of the "roll" or "roller" as referred to herein can include a circular-like shape for contacting the substrate to be processed or already processed. In some implementations, the "roll" or "roller" can have a cylindrical or substantially cylindrical shape. The substantially cylindrical shape can be formed about a straight longitudinal axis or can be formed about a bent longitudinal axis. According to some implementations, the "roll" or "roller" as described herein can be adapted for being in contact with a flexible substrate. For example, a "roll" or "roller" as referred to herein can be a guiding roller adapted to guide a substrate while the substrate is processed (such as during a deposition process) or while the substrate is present in a processing system; a spreader roller adapted for providing a defined tension for the substrate to be coated; a deflecting roller for deflecting the substrate according to a defined travelling path; a processing roller for supporting the substrate during processing, such as a process drum, for example, a coating roller or a coating drum; an adjusting roller, a supply roll, a take-up roll or the like. The "roll" or "roller" as described herein can be or include a metal.

Lithium ion (Li-ion) batteries using graphite anodes and new cell designs typically have a small percentage of silicon powder. Attempts have been made to produce silicon powder alloys to overcome issues relating to volume expansion. If the electrode structure is engineered from a free-standing film to accommodate volume changes, the use of the free-standing film will have substantial impact on manufacturing and integration. Current silicon and/or silicon oxide blended anodes made from slurry coating show promise in cycle life (greater than 500 cycles), but calendar life (less than 2-3 years) is still a major challenge for electric vehicle (EV) adoption. Cell impedance increase over time is also a major issue encountered with current slurry coated powder anodes. The active material surface area and the resulting continuous solid electrolyte interphase (SEI) growth during electrochemical cycling are major issues limiting calendar life and cell impedance growth. In this disclosure, an engineered approach for surface area issues is proposed.

While other approaches use micrometer-scale anode powder particles, surface area control during growth presents fabrication issues. This disclosure relates to controlling the surface area upon cycling of an anode fabricated from a monolith foil. Physical vapor deposition (PVD) or chemical vapor deposition (CVD) deposition approaches to produce silicon anodes are relatively expensive, while powder approaches have calendar life issues despite the promising cycle life and rate capability. The approach proposed in this disclosure produces alloy anodes from a film and engineers the structure to produce low surface area, helping to reduce the impedance growth over cycles and improve calendar life.

In some implementations of the present disclosure, molten metal or metal alloy is deposited directly on a cold casting drum to form an alloy anode film. In one or more embodiments, which can be combined with other embodiments described herein, the molten metal alloy is one of silicon tin aluminum titanium alloy ($Si_{78}Sn_{16}Al_4Ti_2$), titanium aluminum carbon alloy ($Ti_2AlC$ or $Ti_3AlC$), or iron copper silicon alloy ($Fe_2Cu_2Si_5$). The alloy could be either crystalline or amorphous. In one or more embodiments, which can be combined with other embodiments described herein, the molten metal alloy is one of lithium bismuth (Li—Bi) alloy, lithium silver (Li—Ag) alloy, lithium tin (Li—Sn) alloy, or lithium silicon (Li—Si) alloy. The molten metal undergoes rapid solidification (e.g., at a rate of one million degrees per second). The solidified metal or metal alloy is then transferred using a cold transfer process to a substrate at low temperatures.

In some examples, the cold casting drum is coated with a transfer liquid prior to deposition of the molten metal or metal alloy on the casting drum. The transfer liquid prevents the deposited metal or metal alloy from sticking to the cold surface of the casting drum thus improving ease of transfer of the solidified molten metal or metal alloy onto the substrate. In one or more examples, the transfer liquid is a low vapor pressure and/or alkali metal compatible ionic liquid. The transfer liquid can be applied to the casting drum via a roller coating process. After application of the heat transfer liquid to the casting drum, the molten metal or metal alloy can be deposited on the heat transfer layer via a deposition process. After solidification, the solidified metal or metal alloy is then transferred to the substrate by the casting drum. In one or more examples, the metal or metal alloy is lithium and the substrate is a flexible substrate, for example, a lithium-ion anode, a metallized plastic substrate, a copper current collector, or a combination thereof.

In some examples, after application of the transfer liquid to the casting drum, a surface protection layer forming liquid is applied to the casting drum. The surface protection layer forming liquid rapidly solidifies to form a surface protection layer over the layer of transfer liquid. The molten metal or metal alloy is then deposited on the surface protection layer via a deposition process, for example, a spray coating process. After solidification, the solidified metal or metal alloy and the protection layer are then transferred to the substrate by the casting drum. The solidified metal or metal alloy and the protection layer are transferred by the casting drum in the reverse order of their deposition. For example, the solidified metal or metal alloy contacts the substrate with the protection layer formed on the solidified metal or metal alloy layer. In one or more examples, the metal or metal alloy is lithium, the substrate is a flexible substrate, for example, a lithium-ion anode, a metallized plastic substrate, a copper current collector, or a combination thereof, and the protection layer is a surface protection layer such as lithium fluoride, bismuth telluride ($Bi_2Te_3$), copper, indium, gallium, aluminum, aluminum oxide, zinc, zinc oxide, tin, lithium phosphorus oxynitride, lithium nitrate ($LiNO_3$), phosphate, sulfate, carbon, or any combination thereof.

Examples of deposition processes that can be used with the implementations described herein can be or include sputtering, evaporation (e.g., thermal or e-beam), direct liquid application (e.g., slot-die coating, comma bar coating, Meyer rod coating, planar flow melt-spin, casting nozzle coating, or roller coating), spray coating processes (e.g., subsonic spraying, electrostatic spraying, gas pressure spraying, thermal spraying, and plasma spraying), or any combination thereof.

Examples of surface protection films that can be formed using the implementations described herein can be or include at least one or more of a lithium fluoride (LiF) film; a dielectric or ceramic film (e.g., oxides of titanium, aluminum, niobium, tantalum, zirconium, or a combination thereof); one or more metal films (e.g., tin, antimony, bismuth, gallium, germanium, copper films, silver films, gold films, or a combination thereof); a copper chalcogenide film (e.g., CuS, $Cu_2Se$, $Cu_2S$); a bismuth chalcogenide film (e.g., $Bi_2Te_3$, $Bi_2Se_3$); a tin chalcogenide film (e.g., SnTe, SnSe, $SnSe_2$, SnS), a gallium chalcogenide film (e.g., GaS, $Ga_2S_3$, GaSe, $Ga_2Se_3$, GaTe), a germanium chalcogenide film (GeTe, GeSe, GeS), an indium chalcogenide film (e.g., InS, $In_6S_7$, $In_2S_3$, InSe, $InS_4Se_3$, $In_6Se_7$, $In_2Se_3$, InTe, $In_4Te_3$, $In_3Te_4$, $In_7Te_{10}$, $In_2Te_3$, $In_2Te_5$), a silver chalcogenide film ($Ag_2Se$, $Ag_2S$, $Ag_2Te$), boron nitride, lithium nitrate, lithium borohydride, and a combination thereof; and a carbon-containing film. In some examples, the one or more surface protection films are ion-conducting films. In some examples, the one or more surface protection films are permeable to at least one of lithium ions and lithium atoms. The one or more surface protection films provide surface protection of the metal or metal alloy film, which allows for handling of the metal or metal alloy film in a dry room.

Examples of transfer liquids that can be used with the implementations described herein can be or include ionic liquids and heat transfer fluids (e.g., synthetic oils, mineral oils, and molten salts). Examples of oils that can be used with the implementations described herein can be or include synthetic hydrocarbons, silicones, hydrocarbons, aromatic oils, paraffinic oils, and alkylated aromatic oils. Examples of synthetic oils that can be used with the implementations described herein can be or include Therminol® VP-1 (FRAGOL AG), which is a eutectoid mixture of 73.5 wt. % biphenyl ether and 23.5 wt. % biphenyl with a melting point of 12° C., Therminol® D12 (FRAGOL AG), Diphyle® (Bayer A.G.), Dowtherm® (Dow Chemical), Therm® S300 (Nippon Steel), Fragoltherm® F-12 (FRAGOL AG), Para-therm™ LR Low Range Heat Transfer Fluid (plastiXs®), Paratherm™ NF Heat Transfer Fluid (plastiXs®). Examples of mineral oils that can be used with the implementations described herein can be or include Caloria HT 43. Examples of molten salts that can be used with the implementations described herein can be or include nitrate-based molten salts (e.g., $NaNO_3$, $KNO_3$, $NaNO_2$, and $Ca(NO_3)_3$), chloride-based molten salts (e.g., KCl—$MgCl_2$), and fluoride-based molten salts (e.g., LiF—NaF—KF). Examples of ionic liquids that can be used with the implementations described herein can be or include N, N-diethyl-N-methyl-N-(2-methoxyethyl)ammonium [DEME]$^+$, bis(fluorosulfonyl)imide [FSI]$^-$, N-methyl-N-alkyl pyrrolidinium [$C_n$mpyr], N-methyl-N-propylpyrrolidinium bis(trifluoromethanesulfonyl)amide [Cnmpyr TFSI], N-methyl-N-propylpyrrolidinium bis(trifluoromethanesulfonyl)imide [Cnmpyr FSI], bis(trifluoromethanesulfonyl)amide [$NTf_2$]$^-$, N-methyl-N-alkyl piperidinium [$C_n$mpip]$^+$, N-methyl-N-propylpiperidinium bis(trifluoromethanesulfonyl)amide [Cam pip TFSI], N-butyl-N-methylpyrrolidinium dicyanamide [C4mpyr] [DCA], N-methyl-butylpyrrolidinium tetracyanoborate [Cnmpyr TCB], tetrafluoroborate [$BF_4$]$^-$, 1,2-dialkyl methylimidazolium [$C_nC_n$mim]$^+$, dycyanamide [dca]$^-$, imide-based ionic liquids (e.g., bis(trifluoromethanesulfonyl)imide (TFSI$^-$), bis(fluorosulfonyl)imide (FSI$^-$), N-butyl-N-methylpyrrolidinium bis(trifluoromethanesulfonyl)imide ($PYR_{147}$FSI) or N-butyl-N-methylpyrrolidinium bis(fluorosulfonyl)imide (PYR14FSI), 1-ethyl-3-methylimidazolium bis(trifluoromethylsulfonyl)imide [EMI][TFSI]), and polymerized ionic liquid block copolymers (e.g., poly(styrene-b-ethylene oxide) (PS-PEO)/[EMI][TFSI] solutions). Examples of ionic liquids (cationic) that can be used with the implementations described herein include quaternary ammonium, imidazolium, pyrrolidinium, piperidinium, hexatrimethyl phosphonium, triethylsulfonium, which contain N, P, or S. Examples of ionic liquids (anionic) that can be used with the implementations described herein include N,N-bis(trifluoromethane)-sulphonamide (TFSI), bis(fluorosulphonyl)imide (FSI), tetrafluoroborate (BF4) and hexafluorophosphate (PF6), and N-butyl-N-methyl pyrrolidinium bis(trifluoromethanesulfonyl)-imide (Py14-TFSI).

Examples of solid electrolyte formation materials that can be used with the implementations described herein include vinyl carbonate (VC), fluorinated vinyl carbonate (FEC), fluorinated vinyl cyclosiloxanes, fluorinated sulfones, tri (hexafluoroisophosphate) (HFiP), Tris(pentafluorophenyl) phosphine(TPFPP), Biphenyl, 3,4 ethylenedioxythiophene (EDT), biphenyl, cyclohexylbenzene, Cyclohexylbenzen (CHB), 1,3-propanesultone (PS), 1-methyl-1,3-propanesultone, 2-methyl-1,3 propanesultone, 3-methyl-1,3-propanesultone, 1-ethyl-1,3-propanesultone, succinonitrile, sebaconitrile, glutaronitrile, adiponitrile, 1,5-dicyanopentane, 1,6-dicyanohexane, 1,7-dicyanoheptane, 1,8-dicyanooctane, 1,9-dicyanononane, siloxane backbone to poly-ethylene oxide, o-terphenyl, triphenylene, cyclohexylbenzene, biphenyl, 1,3 propane sulfonate, N-butyl-N-methyl pyrrolidinium bis(trifluoromethanesulfonyl)-imide (Py14-TFSI), Poly acrylonitrile (PAN), Poly methyl methacrylate (PMMA), and PVDF.

FIG. 1 illustrates a schematic side view of an exemplary molten metal coating system 100 for fabricating a flexible substrate according to one or more embodiments. The molten metal coating system 100 can be used to form a flexible layer stack. The molten metal coating system 100 includes a molten metal coating module 130 according to one or more implementations described herein. The molten metal coating system 100 further includes an unwinding module 120 operable to supply a flexible substrate such as a continuous flexible substrate 122 to the molten metal coating module 130. The molten metal coating module 130 further includes a winding module 140 operable to collect the flexible substrate from the molten metal coating module 130. The molten metal coating system 100 can be operable for either single-sided or double-sided processing of a flexible substrate. In some implementations, the molten metal coating system 100 is operable for depositing molten metal (e.g., molten lithium) on flexible substrates through a planar flow melt spinning process.

The molten metal coating system 100 can include any suitable structure, configuration, arrangement, and/or components that enable the molten metal coating system 100 to deposit molten metal and/or passivate the deposited molten metal on the continuous flexible substrate 122 according to implementations of the present disclosure. For example, in some implementations the molten metal coating system 100 can be or include suitable deposition systems including casting rollers, sprayers, evaporators, air bearings, power sources, individual pressure controls, deposition control systems, load cells, servomotors, and temperature control components.

The molten metal coating system 100 includes a chamber body 102. The chamber body 102 can be fabricated from standard materials, such as aluminum, quartz, ceramic, or stainless steel. The chamber body 102 can be cooled by a fluid such as, for example, water, one or more glycol-based fluids, or any combination thereof. The chamber body 102 defines an interior volume 103. Partition plates 104a, 104b (collectively 104) extend across the interior volume 103 defined by the chamber body 102. The partition plate 104a separates the interior volume 103 into an unwinding volume 106 operable to supply the continuous flexible substrate 122 and a processing volume 107 in which molten metal is deposited on the continuous flexible substrate 122. The partition plate 104b separates the interior volume 103 into the processing volume 107 and a winding volume 108 operable to collect the processed continuous flexible substrate 122. The partition plates 104a, 104b include one or more through-holes 109a, 109b (collectively 109) respectively for accommodating the continuous flexible substrate 122. Each through-hole 109 in the partition plate 104 is sized to accommodate the continuous flexible substrate 122 while enabling differential pumping between the unwinding volume 106, the processing volume 107, and/or the winding volume 108. In one implementation, the chamber body 102 defines a vacuum chamber. In another implementation, in case of non-vacuum deposition techniques, such as roller coating and slot-die coating, a chamber of a dry room or a glove box, can be used.

In some implementations, an inert gas environment is maintained in at least one of the unwinding volume 106, the processing volume 107, and/or the winding volume 108. The inert gas environment can include an inert gas selected from argon, nitrogen, or combinations of argon and nitrogen. The inert gas environment of the unwinding volume 106, the processing volume 107, and/or the winding volume 108 isolates (e.g., provides gas separation) from the substantially ambient (e.g., atmospheric) environment outside of the molten metal coating system 100, which reduces the likelihood of contamination of the as deposited lithium film. This inert gas environment of the unwinding volume 106, the processing volume 107, and/or the winding volume 108 also isolates (e.g., provides gas separation) the unwinding volume 106 from the processing volume 107 and the processing volume 107 from the winding volume 108, if desired. This isolation enables use of incompatible chemistries in the unwinding volume 106, the processing volume 107, and/or the winding volume 108. In one or more examples, the processing volume 107 contains an argon gas environment and the winding volume 108 contains a combination of argon and a passivation gas (e.g., nitrogen).

In some implementations, at least one of the unwinding volume 106, the processing volume 107, and the winding volume 108 is coupled to a pressure control system (not shown), which pumps down and vents the unwinding volume 106, the processing volume 107, and/or the winding volume 108 as needed to facilitate passing the continuous flexible substrate 122 between the inert gas environment and the substantially ambient (e.g., atmospheric) environment outside of the molten metal coating system 100.

The chamber body 102 includes one or more openings (not shown) for providing access to the interior volume 103. In one or more examples, the one or more openings are positioned at a top of the chamber body 102. The one or more openings can be positioned at other locations of the chamber body 102, which provide access to the chamber components. The chamber body 102 can optionally include a lid (not shown) that can open and close to allow the user access to components within the interior volume 103 of the chamber body 102. In one or more examples, the chamber body 102 includes transparent portions or windows used to monitor processing conditions within the chamber.

It should be understood that although the unwinding volume 106, the processing volume 107, and the winding volume 108 are shown as sharing a common chamber body 102, in some implementations, the unwinding volume 106, the processing volume 107, and the winding volume 108 are defined by separate chamber bodies with the chamber body defining the unwinding volume 106 stacked upon or adjacent to (e.g., side-by-side) the chamber body defining the processing volume 107, and/or the winding volume 108. For example, in some implementations, the molten metal coating system 100 includes an unwinding chamber, which defines the unwinding volume 106, a deposition chamber, which defines the processing volume 107, and a separate winding chamber, which defines the winding volume 108. The unwinding chamber, the deposition chamber, and the winding chamber are separate modular and stackable elements. In one or more examples, the unwinding chamber is positioned adjacent to one side of the deposition chamber and the winding chamber is positioned adjacent to the opposing side of the deposition chamber.

The molten metal coating system 100 is constituted as a roll-to-roll system including the unwinding module 120 operable to supply the continuous flexible substrate 122, the molten metal coating module 130 operable to deposit molten metal on the continuous flexible substrate 122, and the winding module 140 operable to form a passivation film and/or protective film on the molten metal in the winding module 140. The unwinding module 120 includes an unwinding roller 150 operable to supply the continuous flexible substrate 122. The winding module 140 includes a winding roller 160 operable to accept the processed continuous flexible substrate 122. In some implementations, the molten metal coating system 100 can further include a laminate film supply roller (not shown) operable to supply a protective film to the processed continuous flexible substrate 122.

The continuous flexible substrate 122 is provided as a web, which is wound up on a roll, such as the unwinding roller 150. In one or more examples, the continuous flexible substrate 122 has a width of about 15 cm to about 300 cm, and typically has a width of about 160 cm. In addition, the continuous flexible substrate 122 has a thickness of about 8 μm to about 200 μm, for example, a thickness of about 50 μm. The continuous flexible substrate 122 has a front surface 124 and a back surface 126. In one implementation, after processing, the continuous flexible substrate 122 includes a flexible material having a lithium electrode structure and a passivation film formed thereon. In another implementation, after processing, the continuous flexible substrate 122 includes a flexible material having a lithiated electrode structure and a passivation film formed thereon.

The molten metal coating system 100 further includes a common transport architecture 180. The common transport architecture 180 can include any transfer mechanism capable of moving the continuous flexible substrate 122 through the unwinding volume 106, the processing volume 107, and the winding volume 108. In some implementations, the common transport architecture 180 is a reel-to-reel system including the unwinding roller 150 and the winding roller 160. The unwinding roller 150 and the winding roller 160 can be independently heated or cooled depending upon the targeted process conditions. The unwinding roller 150 can be driven and rotary by a motor 152. The winding roller 160 can also be driven and rotary by a motor 162. The unwinding roller 150 and the winding roller 160 can be individually heated using an internal heat source positioned within each reel or an external heating source. The unwinding roller 150 and the winding roller 160 can be individually cooled using either an internal cooling source positioned within each reel or an external cooling source.

In some implementations, the common transport architecture 180 further includes one or more auxiliary tension reels 182a-182d (collectively 182) positioned between the unwinding roller 150 and the winding roller 160. The auxiliary tension reels are disposed on a travel path 142 where the continuous flexible substrate 122 is conveyed between the unwinding roller 150 and the winding roller 160, to allow a tensile force to the continuous flexible substrate 122. This tensile force prevents the continuous flexible substrate 122 from sagging down as well as to change the movement direction of the continuous flexible substrate 122. Accordingly, even though the continuous flexible substrate 122 is moved along a continuously long path, a certain movement rate is constantly maintained. In some implementations, any of the auxiliary tension reels 182 can be replaced with gas cushion rollers. The auxiliary tension reels 182 can be individually heated either using an internal heat source positioned within each reel or an external heat source. The auxiliary tension reels 182 can be individually cooled using either an internal cooling source positioned within each reel or an external cooling source. The auxiliary tension reels 182 can provide at least one functionality selected from guiding the continuous flexible substrate 122, tensioning the continuous flexible substrate 122, charging the continuous flexible substrate 122, discharging the continuous flexible substrate 122, and heating or cooling the continuous flexible substrate 122. The auxiliary tension reels 182 can include one or more servomotors for advancing the continuous flexible substrate 122. The one or more servomotors allow for precise control of linear position, velocity, and/or acceleration of the continuous flexible substrate 122. The one or more servomotors can be coupled with a sensor for position feedback. The common transport architecture 180 can further include one or more servomotors for advancing the continuous flexible substrate 122 and/or one or more load cells for converting web tension into an electrical signal that can be measured and standardized.

Generally, the molten metal coating system 100 includes a system controller 190 operable to control the automated aspects of the molten metal coating system 100. The system controller 190 can be provided and coupled to various components of the molten metal coating system 100 to control the operation thereof. The system controller 190 includes a central processing unit (CPU) 192, a memory 194 (or computer readable medium), and support circuits 196. The system controller 190 can control the molten metal coating system 100 directly, or via computers (or controllers) associated with particular process chamber and/or support system components. The system controller 190 can be one of any form of general-purpose computer processor that can be used in an industrial setting for controlling various chambers and sub-processors. The memory 194 of the system controller 190 can be one or more of readily available memory such as random access memory (RAM), read only memory (ROM), floppy disk, hard disk, optical storage media (e.g., compact disc or digital video disc), flash drive, or any other form of digital storage, local or remote. The support circuits 196 are coupled to the CPU 192 for supporting the processor in a conventional manner. These circuits include cache, power supplies, clock circuits, input/output circuitry and subsystems, and the like. The methods as described herein can be stored in the memory 194 as software routine that can be executed or invoked to control the operation of the molten metal coating system 100 in the manner described herein. The software routine can also be stored and/or executed by a second CPU (not shown) that is remotely located from the hardware being controlled by the CPU 192. In one or more examples, the system controller 190 is operable to control the travel rate of the continuous flexible substrate 122 by monitoring load cells and controlling the servomotors in the auxiliary tension reels 182.

In operation, the continuous flexible substrate 122 is conveyed from the unwinding roller 150 advancing into the molten metal coating module 130. The continuous flexible substrate 122 travels from the unwinding volume 106 through through-hole 109a, advancing into the processing volume 107 of the molten metal coating module 130. In the processing volume 107, the continuous flexible substrate 122 is exposed to a coating process to deposit a molten metal film on the continuous flexible substrate 122 and optionally a surface protection film on the molten metal film. The continuous flexible substrate 122 travels through through-hole 109b, advancing from the processing volume 107 into the winding volume 108. In the winding volume 108, the processed continuous flexible substrate 122 is wound on the winding roller 160.

The molten metal coating module 130 includes one or more processing stations operable to process the continuous flexible substrate 122. For instance, a first deposition source arrangement 132a, 132b (collectively 132) operable to deposit a first layer including a first material over the continuous flexible substrate 122 can be provided. Further, a second deposition source arrangement 134a, 134b (collectively 134) operable to deposit a second layer including a second material over the first layer can be provided. Furthermore, a third deposition source arrangement 136a, 136b (collectively 136) operable to deposit a third layer including a third material over the second layer can be provided.

According to examples described herein, each of the first deposition source arrangement 132, the second deposition source arrangement 134 and the third deposition source arrangement 136 can include one or more deposition sources. Examples of deposition sources can be or include sputtering, evaporation (e.g., thermal or e-beam), direct liquid application (e.g., slot-die coating, comma bar coating, Meyer rod coating, planar flow melt-spin, casting nozzle coating, or roller coating), spray coating processes (e.g., subsonic spraying, electrostatic spraying, gas pressure spraying, thermal spraying, and plasma spraying), or any combination thereof. Specifically, the number of deposition sources per deposition source arrangement, such as the first deposition source arrangement 132, the second deposition source arrangement 134 and the third deposition source arrangement 136, can be adjusted according to the intended thickness of the layer formed by the respective deposition source arrangement. For instance, in case of a negative electrode for a lithium battery, it is desired to have thicker lithium layers than the surface protection film formed thereon. The second deposition source arrangement 134 can be configured for depositing lithium and include more deposition sources than first deposition source arrangement 132 configured for depositing the surface protection film. The first deposition source arrangement 132, the second deposition source arrangement 134, and the third deposition source arrangement 136 each include one deposition source.

The molten metal coating module 130 further includes a pair of rotatable casting drums 138a, 138b (collectively 138) positioned on opposing sides of the continuous flexible substrate 122. The casting drum 138 is a cylinder having a quench surface 144a, 144b (collectively 144) on which molten metal is deposited. The quench surface 144 is a curved surface. The quench surface 144 can be a smooth surface. The quench surface 144 includes at least one of stainless steel, copper, chromium, or a combination thereof. In one or more examples, the quench surface 144 of the casting drum 138 is stainless steel. The casting drum 138 has a rotation axis, which is provided in the molten metal coating system 100. Each casting drum 138 can be driven and rotary by a motor 139a, 139b (collectively 139).

According to some examples described herein, the casting drum 138 can be heated or cooled to a desired processing temperature. A heating or cooling device within the casting drum 138 can be connected to a controller by a connection. According to typical examples described herein, the casting drum 138 can be heated or cooled for deposition purposes. In one or more examples, the casting drum includes coolant channels operable to contain a coolant for cooling the quench surface 144 of the casting drum 138. The coolant channels can be coupled to a coolant source, which supplies a heat transfer fluid. The fluid can be water, ethylene glycol, nitrogen ($N_2$), helium, mixed hydrocarbon gases such as poly-cold, hydrocarbons such as Fragoltherm® F-12; Para-therm™ LR; Paratherm™ NF; mineral oil; Mobil® oil; compressed $CO_2$, or any other fluid used as a heat-exchange medium. In some examples, the casting drum 138 is cooled using an internal cooling source positioned within the casting drum 138. In other examples, the casting drum 138 is cooled using an external cooling source. Further, the casting drum 138 can be cooled during deposition of, for example, a material having a low melting point such as lithium.

The molten metal coating module 130 further includes a peeling layer deposition source arrangement 146a, 146b (collectively 146) operable to deliver a transfer liquid to the quench surface 144 of the casting drum 138. The transfer liquid forms a peeling layer on the quench surface 144 of the casting drum 138. The peeling layer formed on the quench surface 144 prevents subsequently deposited layers from sticking to the quench surface 144. In one or more examples, the peeling layer deposition source arrangement 146 is positioned adjacent to the casting drum 138 and prior to the first deposition source arrangement 132 in sequence such that the transfer liquid is deposited on the quench surface 144 prior to any material layers.

In one implementation, the peeling layer deposition source arrangement 146 includes a pick-up roller or kiss roller 148a, 148b (collectively 148). The kiss roller 148 picks up by contact a wet film including the transfer liquid from a transfer liquid source pool 152a, 152b (collectively 152) and delivers the transfer liquid to the quench surface 144 of the casting drum 138. The kiss roller 148 can further include a servomotor for driving and rotating the kiss roller 148.

In one or more examples, the kiss roller 148 contacts the casting drum 138 while traveling in an anti-direction meaning that the kiss roller 148 rotates in a direction that is opposite the rotation direction of the casting drum 138 (e.g., contact in anti-direction). In some examples, the kiss roller 148 does not contact the casting drum 138 while rotating in the same direction as the rotation direction of the casting drum 138 (e.g., contact-free in co-direction). In other examples, the kiss roller 148 contacts the casting drum 138 while rotating in the same direction as the rotation direction of the casting drum 138 (e.g., contact in co-direction).

The molten metal coating module 130 further includes a removal arrangement 170a, 170b (collectively 170) for removing any material remaining on the casting drum 138 after delivering the material layers to the continuous flexible substrate 122 and prior to applying the peeling layer formation liquid to the casting drum 138. The removal arrangement includes any tool capable of cleaning the quench surface 144 of the casting drum 138. Example of tools that can be used include mechanical tools (e.g., a scraper), a fluid jet, an air jet, or any combination thereof.

In operation, the casting drum 138 rotates through the following in sequence: the peeling layer deposition source arrangement 146, the first deposition source arrangement 132, the second deposition source arrangement 134, the third deposition source arrangement 136, and the removal arrangement 170. Even though it is often referred to herein as deposition source arrangements being the processing stations, also other processing stations, like etch stations or heating stations can be provided along the curved quench surface 144 of the casting drum 138. Accordingly, the molten metal coating system 100 described herein can have compartments for various deposition sources, allowing for a modular combination of several deposition sources or processes in a single deposition apparatus. Exemplary deposition sources or processes can be or include sputtering, evaporation, spraying, PVD, CVD, plasma-enhanced CVD (PE-CVD), atomic layer deposition (ALD), plasma-enhanced ALD (PE-ALD), or any combination thereof.

FIG. 2 is a flow chart illustrating a method of fabricating a flexible substrate according to one or more embodiments. In one or more embodiments, which can be combined with other embodiments described herein, the method 200 is a Planar flow melt spinning process. The method 200 includes, according to operation 210, delivering a transfer liquid to a cooled quenching surface of a rotating casting drum. The transfer liquid can be applied to the casting drum by a kiss roller. The transfer liquid can solidify on a quench surface of the casting drum to form a peeling layer. The peeling layer formed on the cooled quench surface prevents subsequently deposited layers from sticking to the quench surface. For example, if the subsequently deposited layer is a sticky material such as lithium, the peeling layer prevents lithium from sticking to the quenching surface. The transfer liquid is selected to be compatible with both the cooled quenching surface and the subsequently deposited layer.

At operation 220, a material layer stack is formed on the peeling layer, if present, or directly on the quenching surface of the casting drum if the peeling layer is not present. In one or more examples, a first material layer of the material layer stack is a surface protection film, for example, lithium fluoride. In some examples, the first material layer is a low melting temperature metal or metal alloy, for example, lithium. The first material layer may be an alloy anode film. At operation 230, the first material layer can be deposited on the peeling layer by the first deposition source arrangement 132. Optionally, at operation 240, a second material layer is formed on the first material layer. In one or more examples, the second material layer is an additional surface protection film. In some examples, the second material layer is a low melting temperature metal or metal alloy, for example, lithium. The second material layer can be deposited by the second deposition source arrangement 134. Optionally, at operation 250, a third material layer is formed on the second material layer. In one or more examples, the third material layer is a low melting temperature metal or metal alloy, for example, lithium. The third material layer can be deposited by the third deposition source arrangement 136.

In one or more examples, a surface protection layer forming liquid rapidly solidifies to form a surface protection layer over the layer of transfer liquid. The molten metal or metal alloy is then deposited on the surface protection layer via a deposition process, for example, a spray coating process. After solidification, the solidified metal or metal alloy and the protection layer are then transferred to the substrate by the casting drum at operation 260.

At operation 260, the material layer stack is transferred from the casting drum to a flexible substrate. The flexible substrate can be the continuous flexible substrate 122. In one or more examples, the flexible substrate is a plastic substrate, such as, polypropylene, polyethylene, or a combination thereof. In some examples, the flexible substrate has a film formed thereon, for example, a copper substrate having an anode film formed thereon. In some examples, the flexible substrate is a copper substrate or an aluminum substrate. In other examples, the flexible substrate is a plastic substrate coated with a thin layer of metal (e.g., polypropylene or polyethylene coated with copper). The layers of the material layer stack are transferred to the continuous flexible substrate in the reverse order of their deposition on the casting drum. For example, in a planar flow melt spinning process, the solidified metal or metal alloy contacts the flexible substrate with the protection layer formed on the solidified metal or metal alloy layer. In one or more examples, the metal or metal alloy is lithium, the substrate is a flexible substrate, for example, a lithium-ion anode, a metallized plastic substrate, a copper current collector, or a combination thereof, and the protection layer is a surface protection layer such as LiF, $Bi_2Te_3$, Cu, Sn, $LiNO_3$, or a combination thereof.

Optionally, at operation 270, the casting drum is exposed to a cleaning process. The cleaning process is performed to remove the peeling layer (if present) and any other contaminants from the quenching surface of the casting drum prior to repeating operations 210-260. The cleaning process can be performed using, for example, removal arrangement 170 for removing any material remaining on the casting drum after delivering the material layer stack to the continuous flexible substrate 122 and prior to applying/reapplying the transfer liquid to the casting drum 138. The cleaning process can be performed using any tool capable of removing contaminants from the quench surface of the casting drum. Examples of tools that can be used to clean the quench surface of the casting drum include mechanical tools (e.g., a scraper), a fluid jet, an air jet, or any combination thereof.

Figure 3B:
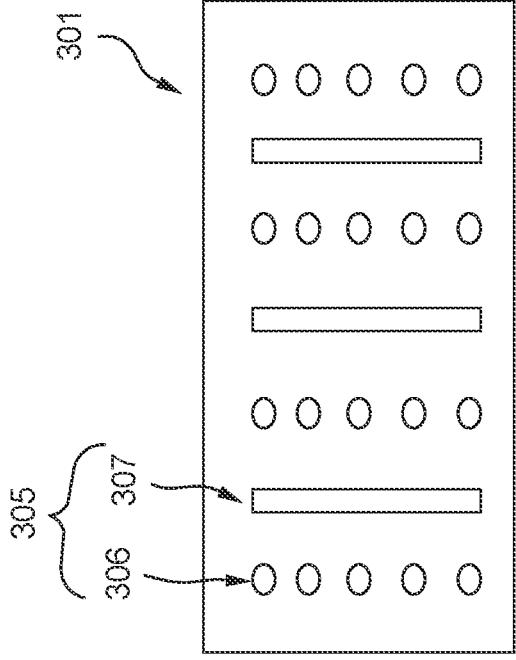
FIG. 3B depicts a schematic, top-down view of the flexible substrate of FIG. 3A, according to one or more embodiments described and discussed herein.
Figure 3A:
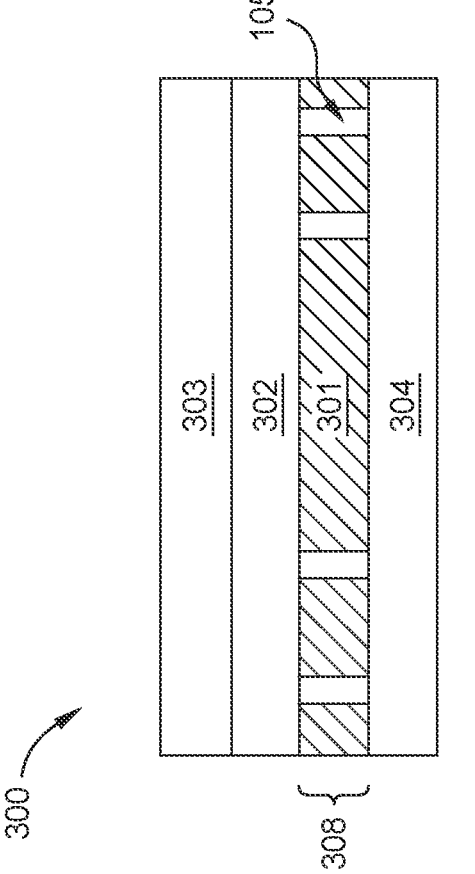
FIG. 3A depicts a schematic, cross-sectional view of a flexible substrate, according to one or more embodiments described and discussed herein.
Figure 3C:
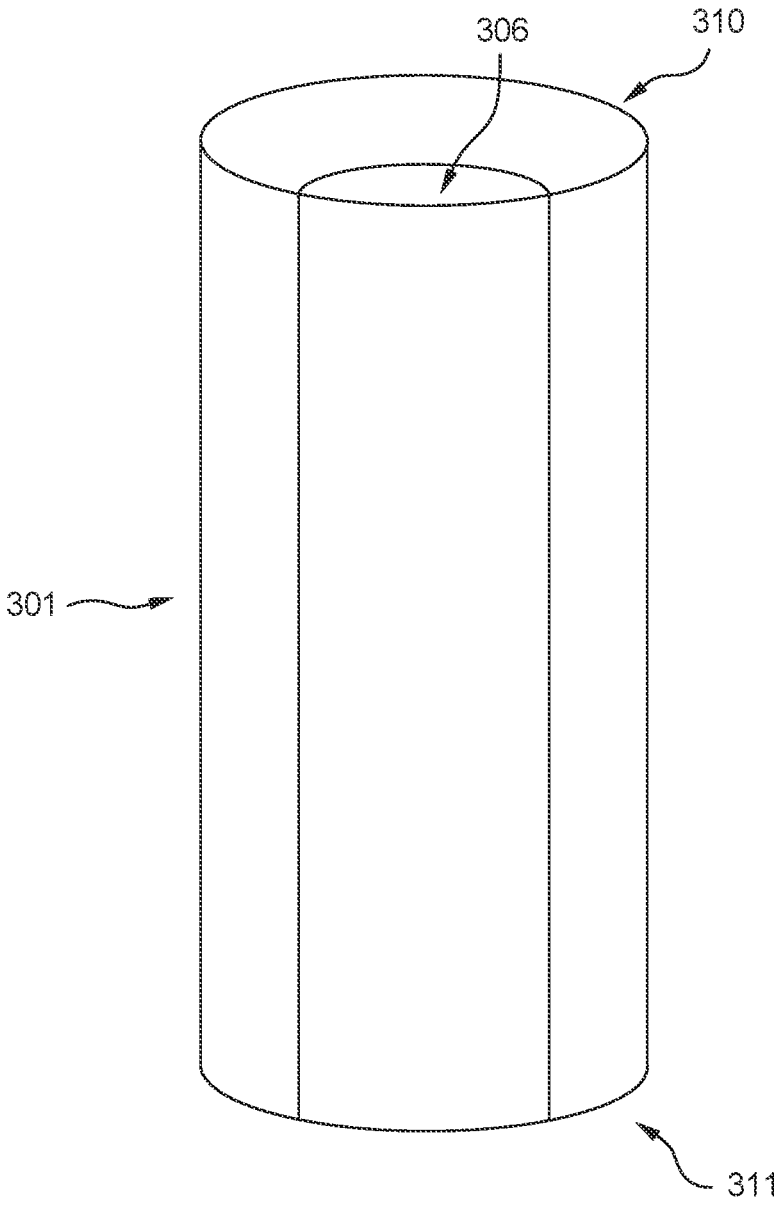
FIG. 3C depicts a schematic, cross-sectional view of a portion of the flexible substrate of FIG. 3A, according to one or more embodiments described and discussed herein.
Figure 4:
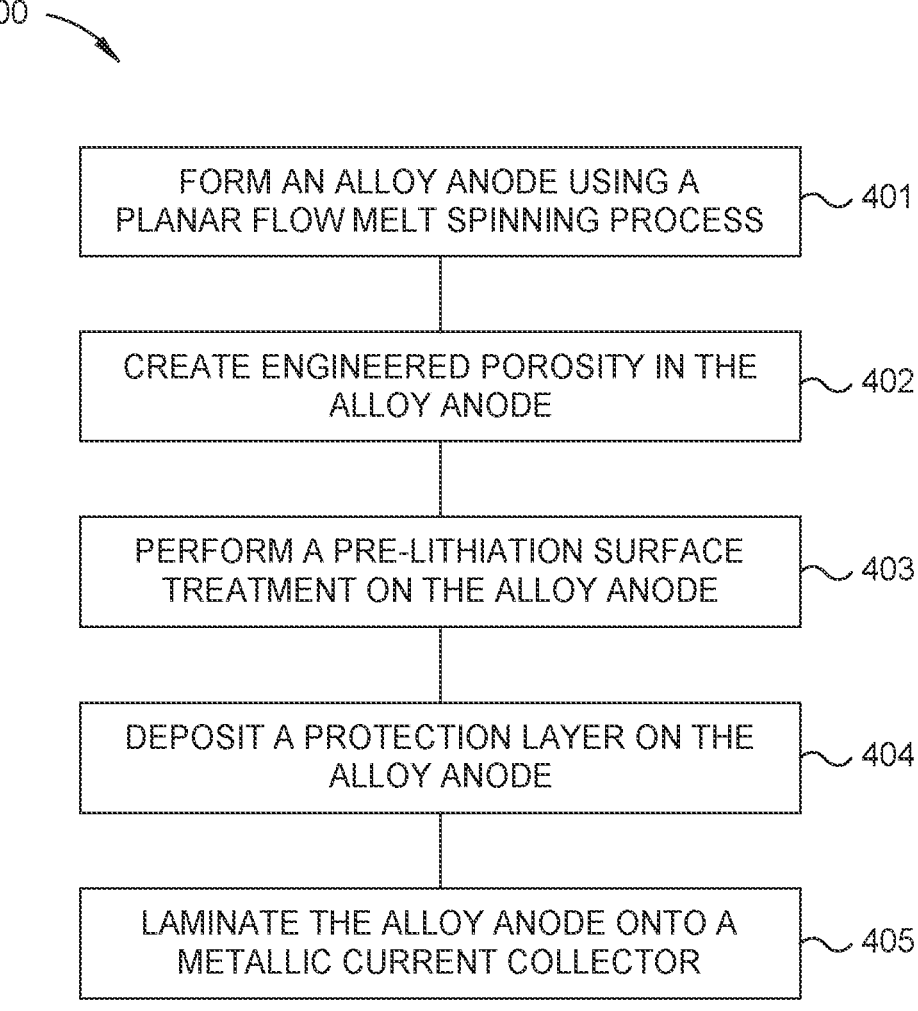
FIG. 4 is a flow chart illustrating a method of fabricating the flexible substrate of FIGS. 3A-3C according to one or more embodiments.

FIG. 3A is a schematic, cross-sectional view of a flexible substrate 300 according to one or more embodiments. FIG. 3B is a schematic, top-view of a portion of the flexible substrate 300 of FIG. 3A according to one or more embodiments. FIG. 4 is a flow chart illustrating a method 400 of fabricating the flexible substrate 300 of FIGS. 3A and 3B according to one or more embodiments. The flexible substrate 300 includes an alloy anode 301. In one or more embodiments, which can be combined with other embodiments described herein, the alloy anode 301 contains silicon, tin, aluminum, titanium, carbon, iron, zinc, gallium, indium, niobium, molybdenum, copper, oxygen, nitrogen, halogen (e.g., F, Cl, Br, I), sulfur, phosphorous, alloys thereof, or any combination thereof.

The alloy anode 301 is formed from the flexible substrate 300 at operation 401 through a planar flow melt spinning process, for example the method 200 described above. The resulting alloy anode 301 is amorphous and glassy in nature. Ideally, the amorphous metal composition of the alloy anode 301 is at least 80% non-crystalline, preferably at least 90%, yet more preferably at least 95%, and most preferably at least 98% non-crystalline. The degree of crystallinity can be confirmed by known techniques. Amorphous metals include those which are rapidly solidified and quenched at a rate of at least $10^4$° C./sec from a supply of molten metal.

Once the alloy anode 301 has been formed, engineered porosity 305, e.g. a plurality of pores 306 or one or more trenches 307, are created in the alloy anode 301 at operation 402. The engineered porosity 305 allow for volumetric expansion of the alloy anode 301 during charging of the battery without resulting in expansion of a thickness 308 of the alloy anode 301. The expanding material expands into the engineered porosity 305 instead of moving the outer boundary of the alloy anode 301. The engineered porosity 305 is created by one of wet etching, electrochemical etching, or laser drilling. In one or more embodiments, which can be combined with other embodiments described herein, wet etching includes an acid treatment. In the wet etching process, according to one embodiment, a silver nanoparticle is used as a catalyst on the surface of the alloy anode 301, and acid etching creates the engineered porosity 305. Silver dots may be patterned on the alloy anode 301 before wet etching to create uniform pore distribution. In embodiments in which laser drilling is performed, a single pulse may be applied in order to form a single through-hole, or pore 306, in the alloy anode 301. Multiple pulses may be applied in order to form a trench 307 in the alloy anode 301. In one or more embodiments, which can be combined with other embodiments described herein, the laser is a repetitively pulsed neodymium-doped yttrium aluminum garnet (Nd:YAG) laser operating at a wavelength of about 1.06 μm, a peak power of about $1\times10^6$ watts, and a pulse repetition rate of about 10 pulses per second. In other embodiments, which can be combined with other embodiments described herein, the laser is a pulsed carbon dioxide ($CO_2$) laser operating at a wavelength of about 10.6 μm, a peak power of about $1\times10^5$ watts, and a pulse repetition rate of about 100 pulses per second. In other embodiments, which can be combined with other embodiments described herein, the laser is a neodymium glass (Nd:glass) laser operating at a wavelength of about 1.06 μm, a peak power of about $1\times10^6$ watts, and a pulse repetition rate of less than 1 pulse per second. The resulting alloy anode 301 and flexible substrate 300 have improved battery life and overall calendar life due to the reduction in undesirable volumetric expansion of the alloy anode 301.

One or more subsequent processes may be performed in order to improve the quality of the resulting flexible substrate 300. At optional operation 403, a pre-lithiation surface treatment is performed on the alloy anode 301. The pre-lithiation surface treatment includes depositing a lithium layer 302 on the alloy anode 301. The lithium layer 302 reduces charge loss. At optional operation 404, a protection layer 303 is deposited on the alloy anode 301. The protection layer 303 includes one or more of lithium fluoride, carbon, silver, bismuth, zinc, antimony, aluminum, silver oxide, bismuth oxide, zinc oxide, antimony oxide, aluminum oxide, silicon oxide, lithium silicon oxide, or any combination thereof. At optional operation 405, the alloy anode 301 is laminated onto a metallic current collector 304. In one or more embodiments, which can be combined with other embodiments disclosed herein, the metallic current collector 304 includes copper. The lamination process uses one of a conductive carbon-based glue or mechanical bonding to adhere the alloy anode 301 to the metallic current collector 304.

Figure 5B:
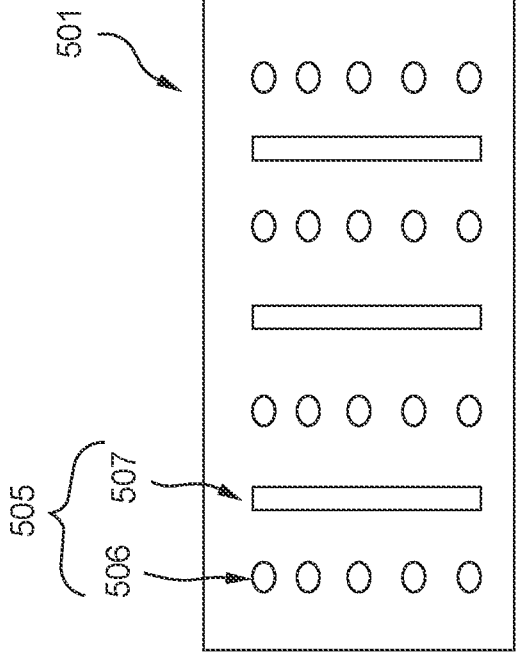
FIG. 5B depicts a schematic, top-down view of the flexible substrate of FIG. 5A, according to one or more embodiments described and discussed herein.
Figure 5A:
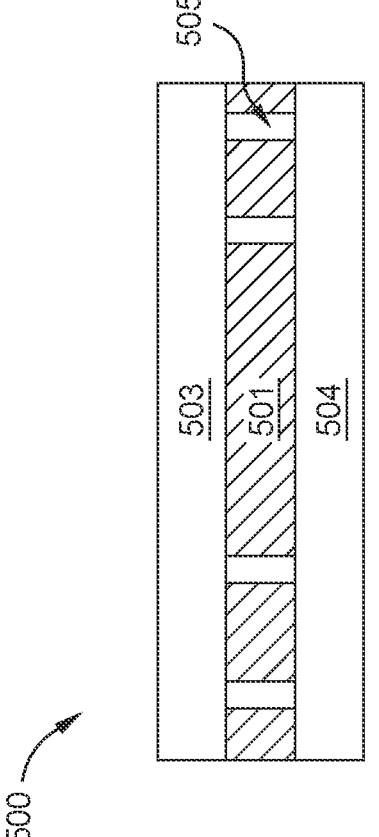
FIG. 5A depicts a schematic, cross-sectional view of a flexible substrate, according to one or more embodiments described and discussed herein.
Figure 6:
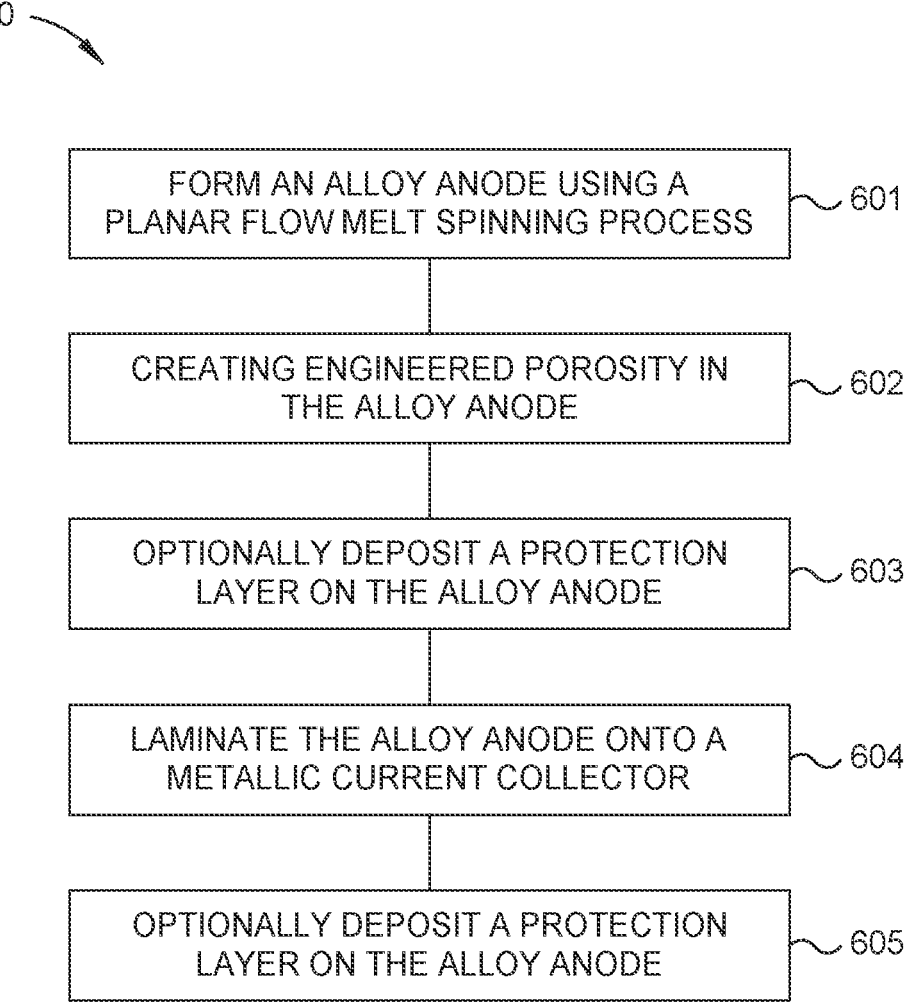
FIG. 6 is a flow chart illustrating a method of fabricating the flexible substrate of FIGS. 5A and 5B, according to one or more embodiments described and discussed herein.

FIG. 5A is a schematic, cross-sectional view of a flexible substrate 300 according to one or more embodiments. FIG. 5B is a schematic, top-down view of the flexible substrate 500 of FIG. 5A according to one or more embodiments. FIG. 6 is a flow chart illustrating a method 600 of fabricating the flexible substrate 500 of FIGS. 5A and 5B according to one or more embodiments. The flexible substrate 500 includes an alloy anode 501. In one or more embodiments, which can be combined with other embodiments described herein, the alloy anode 501 contains lithium and one or more of silicon, tin, silver, bismuth, alloys thereof, or any combination thereof. In one or more embodiments, which can be combined with other embodiments described herein, the alloy anode 501 is one of lithium bismuth (Li—Bi) alloy, lithium silver (Li—Ag) alloy, lithium tin (Li—Sn) alloy, or lithium silicon (Li—Si) alloy, alloys thereof, or any combination thereof. In one or more embodiments, which can be combined with other embodiments described herein, the alloy anode 501 contains doped metals or alloys having a relatively low melting point (e.g., less than 1,000° C.).

As discussed above in regards to FIGS. 2 and 4, the alloy anode 501 is formed at operation 601 through a planar flow melt spinning process, for example, the method 200 described above. The resulting alloy anode 501 is amorphous and glassy in nature. In one or more embodiments, which can be combined with other embodiments described herein, the alloy anode 501 is one of lithium bismuth (Li—Bi) alloy, lithium silver (Li—Ag) alloy, lithium tin (Li—Sn) alloy, or lithium silicon (Li—Si) alloy. Ideally, the amorphous metal composition of the alloy anode 501 is at least 80% non-crystalline, preferably at least 90%, yet more preferably at least 95%, and most preferably at least 98% non-crystalline. Once the alloy anode 501 has been formed, engineered porosity 505, e.g., a plurality of pores 506 and/or trenches 507, are created in the alloy anode 501 at operation 602. In one or more embodiments, which can be combined with other embodiments described herein, a laser drilling treatment is performed on the alloy anode 501 to create the engineered porosity 505.

One or more subsequent processes may be performed in order to improve the quality of the alloy anode 501 and resulting battery. At optional operation 603, a protection layer 503 is disposed on the alloy anode 501. At optional operation 604, the alloy anode 501 is laminated onto a metallic current collector 504. In one or more embodiments, which can be combined with other embodiments disclosed herein, the metallic current collector 504 includes copper. The lamination process uses one of a conductive carbon-based glue or mechanical bonding to adhere the alloy anode 501 to the metallic current collector 504.

At optional operation 605, if operation 603 was not performed, the protection layer 503 is disposed on the alloy anode 501. Accordingly, In one or more embodiments, laminating the alloy anode 501 occurs prior to depositing the protection layer 503. In other embodiments, laminating the alloy anode 501 occurs subsequent to depositing the protection layer 503. The resulting alloy anode 501 has improved battery life and overall calendar life due to the reduction in undesirable volumetric expansion of the alloy anode 501.

In summary, these methods improve the quality of lithium ion batteries formed in cost-effective roll-to-roll (RTR) processes. By controlling surface area growth of the anode through engineered porosity, calendar life is improved, and impedance growth over the cycle is reduced.

Embodiments of the present disclosure further relate to any one or more of the following examples 1-13:

1. A method of fabricating alloy anodes, comprising forming an alloy anode using a planar flow melt spinning process comprising solidifying a molten material over a quenching surface of a rotating casting drum; and performing a pre-lithiation surface treatment on the alloy anode.

2. A method of fabricating alloy anodes, comprising forming an alloy anode comprising lithium using a planar flow melt spinning process comprising solidifying a molten material over a quenching surface of a rotating casting drum; and depositing a protection layer on the alloy anode.

3. A method of fabricating alloy anodes, comprising forming an alloy anode using a planar flow melt spinning process; creating engineered porosity in the alloy anode through laser drilling; performing a pre-lithiation surface treatment; depositing a protection layer on the alloy anode; and laminating the alloy anode onto a current collector.

4. The method according to any one of examples 1-3, wherein the alloy anode comprises silicon, tin, aluminum, titanium, carbon, iron, copper, alloys thereof, or any combination thereof.

5. The method according to any one of examples 1-4, wherein the alloy anode is at least 95% non-crystalline.

6. The method according to any one of examples 1-5, further comprising creating engineered porosity in the alloy anode.

7. The method according to any one of examples 1-6, wherein creating engineered porosity comprises forming a plurality of pores, one or more trenches, or a combination thereof in the alloy anode.

8. The method according to any one of examples 1-7, wherein the plurality of pores and the one or more trenches are laser drilled into the alloy anode.

9. The method according to any one of examples 1-8, further comprising depositing a protection layer on the alloy anode.

10. The method according to any one of examples 1-9, wherein the protection layer comprises one or more of lithium fluoride, carbon, silver, bismuth, zinc, antimony, aluminum, silver oxide, bismuth oxide, zinc oxide, antimony oxide, aluminum oxide, silicon oxide, lithium silicon oxide, or any combination thereof.

11. The method according to any one of examples 1-10, further comprising laminating the alloy anode onto a metallic current collector.

12. The method according to any one of examples 1-11, wherein laminating the alloy anode occurs prior to depositing the protection layer.

13. The method according to any one of examples 1-12, wherein laminating the alloy anode occurs subsequent to depositing the protection layer.

While the foregoing is directed to embodiments of the disclosure, other and further embodiments may be devised without departing from the basic scope thereof, and the scope thereof is determined by the claims that follow. All documents described herein are incorporated by reference herein, including any priority documents and/or testing procedures to the extent they are not inconsistent with this text. As is apparent from the foregoing general description and the specific embodiments, while forms of the present disclosure have been illustrated and described, various modifications can be made without departing from the spirit and scope of the present disclosure. Accordingly, it is not intended that the present disclosure be limited thereby. Likewise, whenever a composition, an element, or a group of elements is preceded with the transitional phrase "comprising", it is understood that the same composition or group of elements with transitional phrases "consisting essentially of", "consisting of", "selected from the group of consisting of", or "is" preceding the recitation of the composition, element, or elements and vice versa, are contemplated.

Certain embodiments and features have been described using a set of numerical minimum values and a set of numerical maximum values. It should be appreciated that ranges including the combination of any two values, e.g., the combination of any minimum value with any maximum value, the combination of any two minimum values, and/or the combination of any two maximum values are contemplated unless otherwise indicated. Certain minimum values, maximum values, and ranges appear in one or more claims below.

What is claimed is:

1. A method of fabricating alloy anodes, comprising:
forming an alloy anode using a planar flow melt spinning process comprising:
providing a transfer liquid to a quenching surface of a rotating casting drum;
forming a first protection layer by providing a protection layer fluid or vapor over the transfer liquid on the quenching surface of the rotating casting drum, and
solidifying a molten material over the first protection layer on the quenching surface of the rotating casting drum; and
performing a surface treatment on the alloy anode.

2. The method of claim 1, wherein the alloy anode comprises silicon, tin, aluminum, titanium, carbon, iron, copper, alloys thereof, or any combination thereof.

3. The method of claim 1, wherein the alloy anode is at least 95% amorphous by volume.

4. The method of claim 1, further comprising creating engineered porosity in the alloy anode.

5. The method of claim 4, wherein creating engineered porosity comprises forming a plurality of pores, one or more trenches, or a combination thereof in the alloy anode.

6. The method of claim 5, wherein the plurality of pores are laser drilled into the alloy anode.

7. The method of claim 1, further comprising depositing a second protection layer on the alloy anode.

8. The method of claim 7, wherein the second protection layer comprises one or more of lithium fluoride, carbon, silver, bismuth, zinc, antimony, aluminum, silver oxide, bismuth oxide, zinc oxide, antimony oxide, aluminum oxide, silicon oxide, lithium silicon oxide, or any combination thereof.

9. The method of claim 1, further comprising laminating the alloy anode onto a metallic current collector.

10. A method of fabricating alloy anodes, comprising:
forming an alloy anode comprising lithium using a planar flow melt spinning process comprising:
providing a transfer liquid to a quenching surface of a rotating casting drum;
forming a first protection layer by providing a protection layer fluid or vapor over the transfer liquid on the quenching surface of the rotating casting drum, and
solidifying a molten material over the first protection layer on the quenching surface of the rotating casting drum; and
depositing a second protection layer on the alloy anode.

11. The method of claim 10, further comprising creating engineered porosity on the alloy anode.

12. The method of claim 11, wherein creating engineered porosity comprises performing a laser drilling treatment to form a plurality of pores, one or more trenches, or a combination thereof in the alloy anode.

13. The method of claim 10, wherein the second protection layer comprises one or more of lithium fluoride, carbon, silver, bismuth, zinc, antimony, aluminum, silver oxide, bismuth oxide, zinc oxide, antimony oxide, aluminum oxide, silicon oxide, lithium silicon oxide, or any combination thereof.

14. The method of claim 10, further comprising laminating the alloy anode onto a metallic current collector.

15. The method of claim 14, wherein laminating the alloy anode occurs prior to depositing the second protection layer.

16. The method of claim 14, wherein laminating the alloy anode occurs subsequent to depositing the second protection layer.

17. A method of fabricating alloy anodes, comprising:
providing a transfer liquid to a quenching surface of a rotating casting drum;
forming a first protection layer by providing a protection layer fluid or vapor over the transfer liquid on the quenching surface of the rotating casting drum;
forming an alloy anode using a planar flow melt spinning process over the first protection layer;
creating engineered porosity in the alloy anode through laser drilling;
performing a pre-lithiation surface treatment;
depositing a second protection layer on the alloy anode; and
laminating the alloy anode onto a current collector.

18. The method of claim 17, wherein the alloy anode comprises silicon, tin, aluminum, titanium, carbon, iron, copper, alloys thereof, or any combination thereof.

19. The method of claim 17, wherein creating engineered porosity comprises forming a plurality of pores, one or more trenches, or a combination thereof in the alloy anode.

20. The method of claim 17, wherein the first protection layer comprises one or more of lithium fluoride, carbon, silver, bismuth, zinc, antimony, aluminum, silver oxide, bismuth oxide, zinc oxide, antimony oxide, aluminum oxide, silicon oxide, lithium silicon oxide, or any combination thereof.

* * * * *